United States Patent [19]

Weeks et al.

[11] Patent Number: 4,934,861
[45] Date of Patent: Jun. 19, 1990

[54] ATTACHMENT APPARATUS FOR EXTERNAL STORES ON THIN-WALL POLES

[75] Inventors: George E. Weeks; Theodore W. Ryan, both of Moundville, Ala.

[73] Assignee: The University of Alabama, Tuscaloosa, Ala.

[21] Appl. No.: 261,735

[22] Filed: Oct. 24, 1988

[51] Int. Cl.⁵ ............................................. F16B 23/00
[52] U.S. Cl. .................... 403/408.1; 403/167; 403/388; 411/339; 411/533
[58] Field of Search .................. 403/408.1, 168, 167, 403/19, 16, 156, 195, 197, 194, 388, 258; 411/339, 546, 535, 536, 395, 533, 368, 369

[56] References Cited

U.S. PATENT DOCUMENTS

| | | |
|---|---|---|
| 1,136,010 | 4/1915 | Hendricks et al. |
| 1,299,787 | 4/1919 | Schluter . |
| 1,603,003 | 10/1926 | Ennis . |
| 1,871,668 | 8/1932 | Dawson ........................ 403/167 X |
| 2,120,077 | 6/1938 | Schmidt . |
| 2,526,511 | 10/1950 | Smythe . |
| 2,744,674 | 5/1956 | Smith . |
| 2,858,153 | 10/1958 | Petersen ........................ 403/388 |
| 2,882,630 | 4/1954 | Frey . |
| 2,883,012 | 4/1959 | Hoffman ........................ 403/408.1 |
| 2,990,151 | 6/1961 | Phillips . |
| 3,078,002 | 2/1963 | Rodgers . |
| 3,137,470 | 6/1964 | Feldman . |
| 3,233,853 | 2/1966 | Majewski . |
| 3,315,393 | 4/1967 | Louft . |
| 3,325,950 | 6/1967 | Pfaff . |
| 3,445,582 | 5/1969 | Herrenkohl et al. . |
| 3,512,328 | 5/1970 | Eriksson ........................ 411/339 X |
| 3,540,111 | 11/1970 | Wainwright . |
| 3,544,110 | 12/1970 | Dickinson . |
| 3,606,416 | 9/1971 | Hatter et al. ...................... 403/408.1 |
| 4,373,309 | 2/1983 | Lutz . |
| 4,444,365 | 4/1984 | Heuberger .................... 403/408.1 X |
| 4,496,261 | 1/1985 | Cohen et al. ................. 403/408.1 X |

*Primary Examiner*—Peter M. Cuomo
*Attorney, Agent, or Firm*—Oblon, Spivak, McClelland, Maier & Neustadt

[57] ABSTRACT

An apparatus for attaching external stores or loads on a thin walled pole includes a first, open ended and externally threaded hollow sleeve defining a shoulder at one end, and a second, open ended and internally threaded hollow sleeve. An elliptical disk mounted to one end of the second sleeve defines a second shoulder. An other end of the first sleeve is threadable in an other end of the second sleeve to form a hollow sleeve assembly of variable length. The elliptical disk has an elliptical projection which fits in an elliptical hole of a thin walled pole when the hollow sleeve assembly is fitted therein. By using an external tool to relatively rotate the first and second hollow sleeves, one can tighten the hollow sleeve assembly to provide an expansive prestress and support for a bolt which passes through the hollow sleeve assembly for attachment of stores or loads.

17 Claims, 3 Drawing Sheets

4,934,861

ATTACHMENT APPARATUS FOR EXTERNAL STORES ON THIN-WALL POLES

BACKGROUND OF THE INVENTION

1. Field of the Invention:

The present invention is directed to thin walled poles to which external stores or loads are to be attached and to an apparatus for attaching these external stores to a thin walled pole.

2. Background of the Related Art:

It is sometimes desirable to use thin walled poles as load bearing members since they have high torsion and bending stiffness relative to their weight, as compared to solid poles. Often the thin walled poles are formed of a composite material such as a fiber reinforced plastic or resin material.

The attachment of external loads to such a thin walled pole presents particular problems. It is known to attach external loads via adhesives, particularly in the case of composite poles which cannot be welded. However, providing a secure adhesive attachment between the pole and external loads is labor intensive and lacks long term integrity for supporting the loads.

It would be desirable to be able to extend a bolt through the thin walled pole and tighten the bolt as a means for attaching external loads to the thin walled pole, much as such a bolt might be used for attachment of loads to solid poles. However, thin walled poles, particularly those formed of composite materials, have low resistance to local distortion and subsequent collapse due to radially compressive forces. Therefore, any attempt to tighten such a bolt onto the thin walled pole could easily result in local distortion and subsequent collapse of the thin walled pole.

SUMMARY OF THE INVENTION

It is an object of the present invention to provide an apparatus for attaching external stores or loads to a thin walled pole.

It is a further object of the invention to provide an apparatus for preloading and reinforcing a thin walled pole against radially compressive loads.

It is yet a further object of the invention to provide a thin walled pole capable of accepting a bolt therethrough for attachment of external stores or loads.

In accordance with the present invention, the above and other objects are accomplished by means of an apparatus for attaching external stores on a thin walled pole, comprising a first hollow, open ended and externally threaded sleeve having mounted thereon first shoulder means adjacent one end thereof, and a second hollow, open ended and internally threaded sleeve having mounted thereon second shoulder means adjacent one end thereof. An other end of the first sleeve is threadable in an other end of the second sleeve to form a hollow sleeve assembly of variable length through which a bolt may extend. One of the shoulder means has a non-circular projection on a face thereof opposite the other end of the sleeve to which the one of the shoulder means is mounted. The second sleeve has at the one end thereof a means for accepting a tool for rotating second sleeve, so that a length of the sleeve assembly may be adjusted to apply an expansive preload to the pole.

According to a further feature of the invention, the one of the shoulder means is formed separately from the second sleeve, including means for releasably and non-rotatably attaching the one of the shoulder means to said sleeve to which said one of said shoulder means is mounted so that compressive loads are applied only to the hollow sleeve assembly.

According to a further feature of the invention, the sleeve to which the one of the shoulder means is mounted is the second sleeve and the second shoulder means comprises an elliptical plate. The non-circular projection comprises an elliptical central projection on one face of the elliptical plate.

According to another feature of the invention, the means for releasably and non rotatably attaching comprise a hole having a diameter smaller than that of the second sleeve and extending through the elliptical plate to the central projection. A small diameter extension is provided at the one end of the second sleeve and is loosely fittable in the hole. Key means are provided on the extension and the elliptical plate for preventing rotation therebetween.

According to a further feature of the invention, the means for accepting a tool comprise an extension of the one end of the first sleeve and diametrically opposed grooves on the extension.

According to a further feature of the invention, a bolt is insertable through the sleeve assembly to support external stores or loads.

According to a further feature of the invention, the sleeve assembly is positioned in a thin walled pole with the shoulder means abutting correspondingly shaped holes in the thin walled pole.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1:
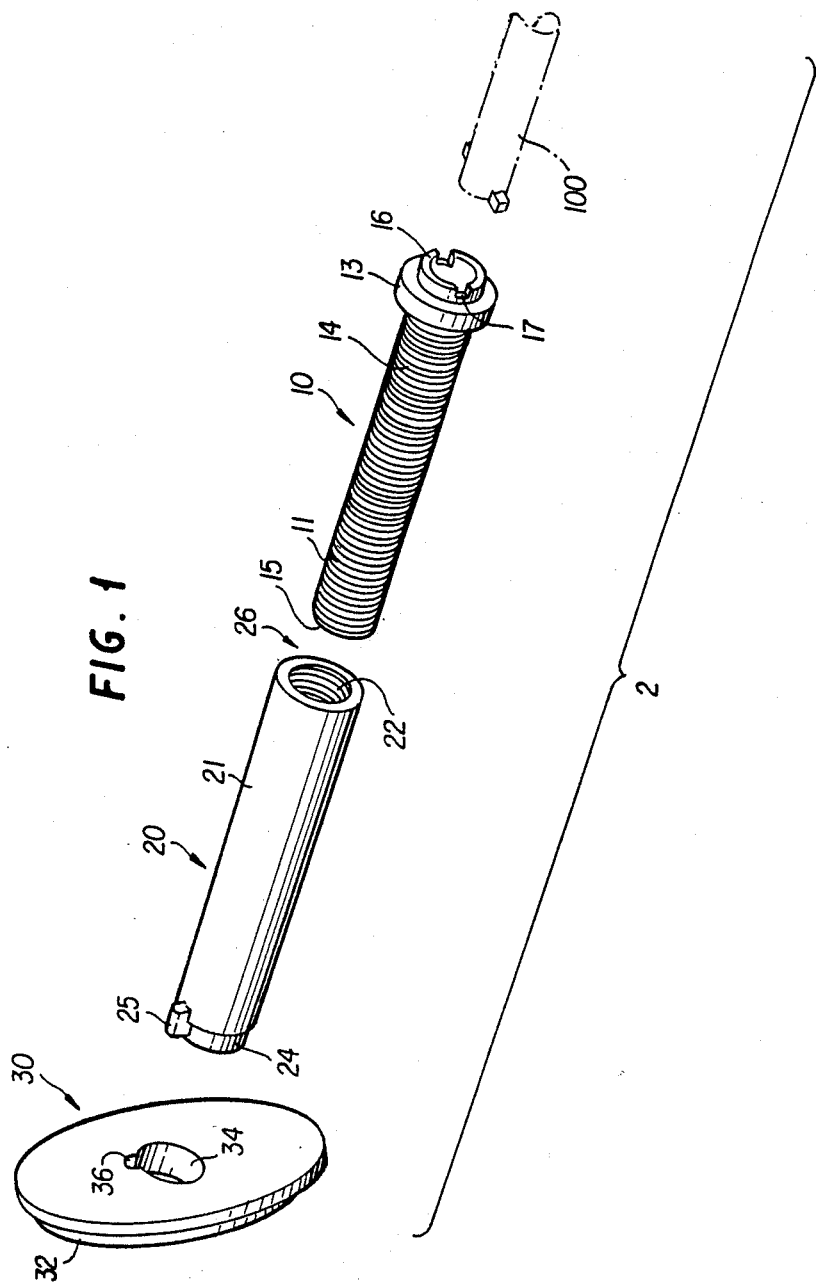
FIG. 1 is an exploded view of the sleeve assembly of the invention.
Figure 2:
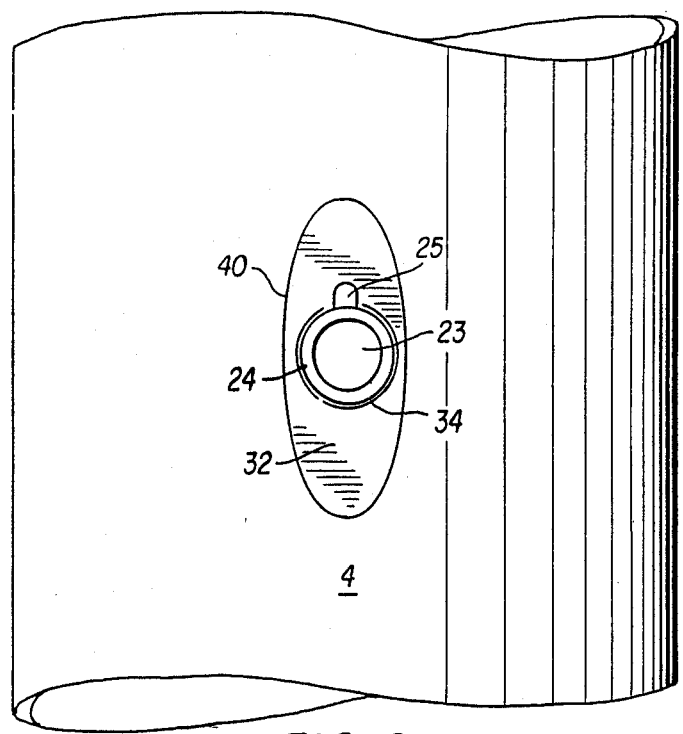
FIG. 2 is an elevation view showing a portion of a thin walled pipe having the apparatus of the invention fitted therein.

A preferred embodiment of the invention will now be described with reference to the accompanying figures, wherein the same reference numerals are used for the same or corresponding elements throughout the various views.

Figure 3:
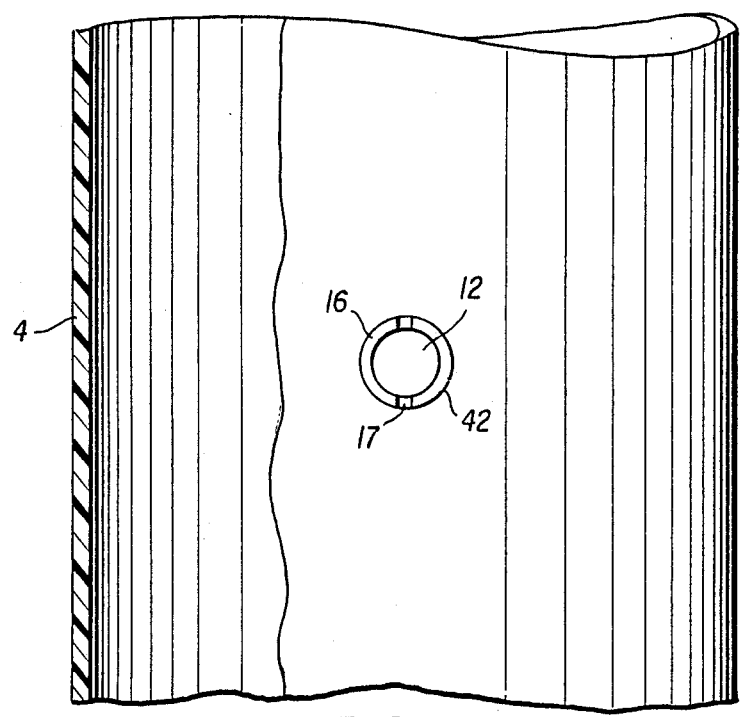
FIG. 3 is similar to FIG. 2, except that it is partially in section, and shows the thin walled pipe at a position diametrically opposed from that of FIG. 2.
Figure 4:
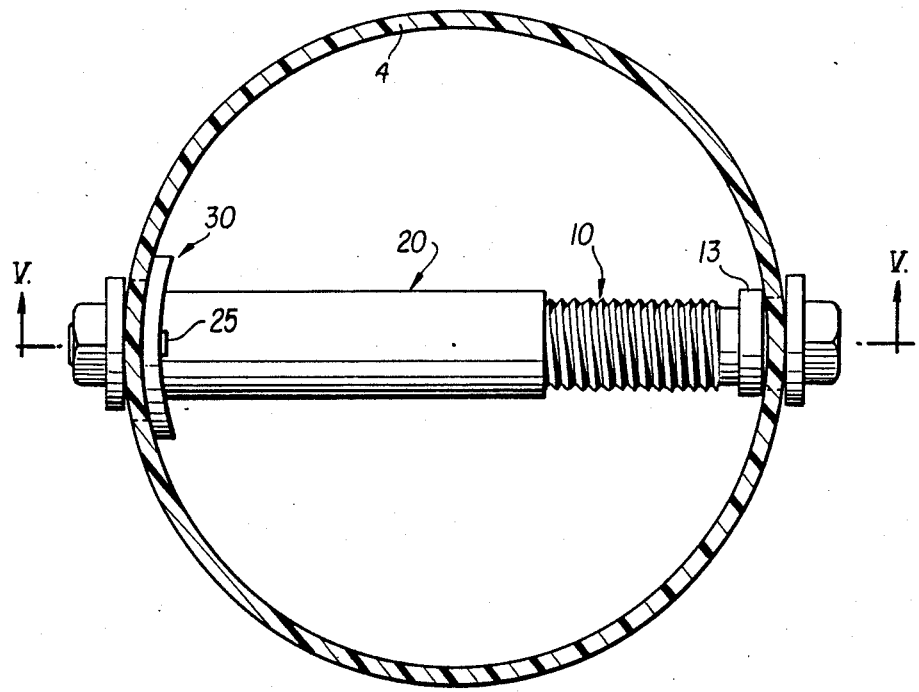
FIG. 4 is an axial end view of a thin walled pipe having the sleeve assembly of the invention installed therein.
Figure 5:
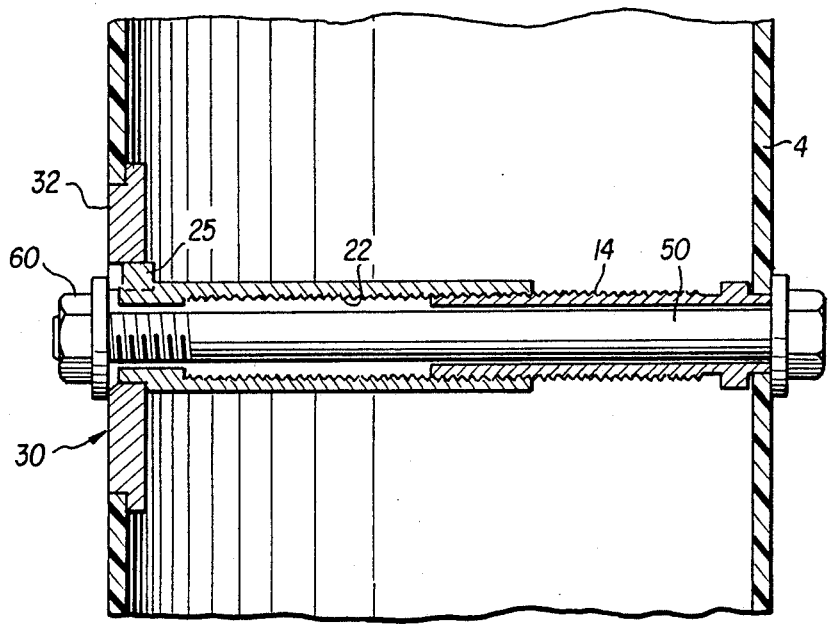
FIG. 5 is a sectional view along line V—V in FIG. 4 and shows a bolt fitted in the sleeve assembly.

In the exploded view of FIG. 1, the sleeve assembly 2 according to an embodiment of the invention is shown having three major components: an externally threaded hollow first sleeve 10, an internally threaded hollow second sleeve 20 and a second shoulder means in the form of an elliptical plate 30. Upon assembly of the externally threaded sleeve 10, the internally threaded sleeve 20 and the elliptical plate 30, the resulting sleeve assembly 2 may be securely fitted within the thin walled pipe 4 as shown in FIGS. 3, 4 and 5.

The externally threaded sleeve 10 is preferably formed with a hollow steel shaft 11 having a bore 12 extending therethrough. An annular washer 13 is integrally formed on one end of the shaft to define a first shoulder means. External threading 14 is formed along the length of the sleeve to the second end 15 thereof. A projection 16 formed as an extension of the sleeve on the end thereof having the washer 13 has a pair of diametrically opposed notches 17 in the axial end thereof in order to accept a spanner type tool 100 which can be used for rotating the externally threaded sleeve.

The internally threaded sleeve 20 is in the form of a hollow steel shaft 21 having internal threads 22 formed on the walls of a bore 23 extending therethrough. A hollow extension 24 at one end of sleeve 20 has an external diameter smaller than that of the shaft 21. A key 25 extends radially out from both the shaft 21 and the extension 24 to a distance greater than the diameter of the shaft 21.

The elliptical plate 30 is formed of steel or other suitable material and has an elliptical central projection 32 forming a plateau extending from a face thereof. A central hole extends through the elliptical plate and the central projection so that the extension 24 of the internally threaded sleeve can be loosely fitted therein. A key way 36 of the central hole 34 accepts the key 25 so as to prevent relative rotation between the internally threaded sleeve 20 and the elliptical plate 30.

In order to install the sleeve assembly 2 within the thin walled pipe, as shown in FIGS. 4 and 5, the other end 15 of the externally threaded sleeve is threaded into the other end 26 of the internally threaded sleeve and the resulting assembly is fitted through an elliptical hole 40 cut or otherwise formed in the side wall of the thin walled pipe 4, the hole 40 having a shape and size identical to that of the central projection 32 of the elliptical plate 30.

It is important that the elliptical plate 30 not be attached to the sleeve 20 at this time. Since its size is larger than that of the hole 40, the insertion of the elliptical plate 30 through the hole 40 requires that plate 30 be turned obliquely to the hole 40, and this would be difficult or impossible with the sleeve 20 attached.

The assembly of sleeves 10 and 20 is mounted with the extension 16 of the externally threaded sleeve 10 fitted in the circular hole 42 cut or otherwise formed in the side wall of the thin walled pole 4 diametrically opposite the hole 40. The sleeve 10 can then be manually held in place via the externally disposed extension 16. The externally threaded sleeve 10 should at this time be threaded sufficiently into the internally threaded sleeve 20 that the extension 24 of the internally threaded sleeve does not interfere with the elliptical plate 30 as it is obliquely inserted into the hole 40.

Upon the insertion of the elliptical plate 30 in the hole 40, it is mounted on the extension 24 via the central hole 34 and the key and key way assembly 25, 36. It is then possible to manually support the elliptical plate via the bore 23 as the externally threaded sleeve 10 is rotated via the tool 100 so as to extend the length of the sleeve assembly until the elliptical central projection 32 fits into the correspondingly shaped and sized elliptical hole 40 of the side wall. As the externally threaded sleeve 10 is further rotated, the cooperation of the elliptical projection 32 with the elliptical hole 40, and the key and key way assembly 25, 36, prevents the rotation of the elliptical plate 30 and internally threaded sleeve 20, so that the length of the sleeve assembly is further expanded to abut the washer 13 and the elliptical plate 30, each comprising shoulder means, forcefully against the inner surface of the thin walled pole 4, thereby expansively preloading the pole 4.

Subsequently, when a bolt 50 is fitted through the sleeve assembly 2 and is tightened by the nut 60, the resulting compressive load will be offset by the expansive preload of the sleeve assembly, and will be primarily supported by the sleeve assembly to prevent the radial collapse of the thin walled pole.

The invention is not limited to the preferred embodiment and is susceptible to other forms of execution. For example, the sleeve assembly need not be made of steel, but can be made of any other rigid material having good compressive resistance. The elliptical extension 32 need not be elliptical, but can be of any other shape capable of cooperating with a correspondingly shaped hole 40 to prevent rotation of the elliptical plate 30. Although the elliptical plate 30 is shown as having a curvature corresponding to that of the thin walled pole, it can instead be flat. Any other means, other than the key and key way assembly, can be used for preventing rotation of the elliptical plate 30 on the internally threaded sleeve 20. Appropriate resilient washers may be placed between the thin walled pole and the shoulder means to protect the walls of the pole from abrasion. The thin walled pole 4 is preferably made of a composite material such as a fiber reinforced resin, but could be made of any other structural material.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. An apparatus for attaching external stores on a thin walled pole, comprising:

a first hollow, open ended and externally threaded sleeve having mounted thereon first shoulder means adjacent one end thereof; and a second hollow, open ended and internally threaded sleeve having mounted thereon second shoulder means adjacent one end thereof, an other end of said first sleeve being threadable in an other end of said second sleeve to form a hollow sleeve assembly of variable length through which may be extend a bolt for supporting external stores, wherein one of said shoulder means has a non-circular axial projection on a face of said one of said shoulder means opposite said other end of the sleeve to which said one of said shoulder means is mounted;

wherein the first sleeve has at the one end thereof a for accepting a tool for rotating the first sleeve, whereby a length of said sleeve assembly may be adjusted to apply an expansive preload to a thin walled pole, and wherein said one of said shoulder means is formed separately from said second sleeve, including means for releasably and non-rotatably attaching said one of said shoulder means to said second sleeve whereby compressive loads due to tightening a bolt in the hollow sleeve assembly are applied substantially only to said hollow sleeve assembly.

2. The apparatus of claim 1 wherein said sleeve to which said one of said shoulder means is mounted is said second sleeve.

3. The apparatus of claim 2 wherein said one of said shoulder means comprises an elliptical plate and said non-circular projection comprises an elliptical central projection on one face of said elliptical plate.

4. The apparatus of claim 3 wherein said means for releasably and non-rotatably attaching comprise a hole having a diameter smaller than that of said second sleeve and extending through said elliptical plate to said central projection, a small diameter extension at said one end of said second sleeve and loosely fittable in said hole, and key means on said extension and said elliptical plate for preventing rotation therebetween.

5. The apparatus of claim 3 in combination with a bolt insertable through said sleeve assembly to support external stores.

6. The apparatus of claim 5 in combination with a thin walled pole having extending therethrough a circular hole and a diametrically opposed elliptical hole having a size corresponding to that of said central projection, wherein said sleeve assembly is positioned in said pole with said first shoulder means abutted on an inner wall of said pole and surrounding said circular hole and said elliptical plate abutted on an inner wall of said pole surrounding said elliptical hole with said central projection fitted in said elliptical hole.

7. The apparatus of claim 3 in combination with a thin walled pole having extending therethrough a circular hole and a diametrically opposed elliptical hole having a size corresponding to that of said central projection, wherein said sleeve assembly is positioned in said pole with said first shoulder means abutted on an inner wall of said pole and surrounding said circular hole and said elliptical plate abutted on an inner wall of said pole surrounding said elliptical hole with said central projection fitted in said elliptical hole.

8. The apparatus of claim 2 wherein said means for accepting a tool comprise an extension of said one end of said first sleeve and diametrically opposed grooves in said extension.

9. The apparatus of claim 1 in combination with a bolt insertable through said sleeve assembly to support external stores.

10. The apparatus of claim 1 in combination with a bolt insertable through said sleeve assembly to support external stores.

11. The apparatus of claim 10 in combination with a thin walled pole having extending therethrough a circular hole and a diametrically opposed non-circular hole having a shape and size corresponding to that of said non-circular projection, wherein said sleeve assembly is positioned in said pole with said other shoulder means abutted on an inner wall of said pole adjacent said circular hole and said one shoulder means abutted on an inner wall of said pole adjacent said non-circular hole with said non-circular projection fitted in said non-circular hole.

12. The apparatus of claim 1 in combination with a thin walled pole having extending therethrough a circular hole and a diametrically opposed non-circular hole having a shape and size corresponding to that of said non-circular projection, wherein said sleeve assembly is positioned in said pole with said other shoulder means abutted on an inner wall of said pole adjacent said circular hole and said one shoulder means abutted on an inner wall of said pole adjacent said non-circular hole with said non-circular projection fitted in said non-circular hole.

13. The apparatus of claim 12 wherein said thin walled pole is formed from fiber reinforced resinous material.

14. The apparatus of claim 1 in combination with a thin walled pole having extending therethrough a circular hole and a diametrically opposed non-circular hole having a shape and size corresponding to that of said non-circular projection, wherein said sleeve assembly is positioned in said pole with said other shoulder means abutted on an inner wall of said pole adjacent said circular hole and said one shoulder means abutted on an inner wall of said pole adjacent said non-circular hole with said non-circular projection fitted in said non-circular hole.

15. The apparatus of claim 14 wherein said elliptical plate and central projection are curved to conform to a curvature of said pole.

16. The apparatus of claim 14 wherein said sleeve assembly is formed of steel.

17. The apparatus of claim 1 wherein said sleeve assembly is formed of steel.

* * * * *